UNITED STATES PATENT OFFICE

JOHN M. TINKER AND LOUIS SPIEGLER, OF SOUTH MILWAUKEE, WISCONSIN, ASSIGNORS TO E. I. DU PONT DE NEMOURS & COMPANY, OF WILMINGTON, DELAWARE, A CORPORATION OF DELAWARE

PROCESS FOR THE PREPARATION OF ARYLIDES OF 2,3-HYDROXY-NAPHTHOIC ACID

No Drawing.   Application filed November 16, 1931.   Serial No. 575,484.

This invention relates to intermediates for azo dyestuffs. More particularly, this invention deals with a novel, improved process for preparing arylides of 2,3-hydroxy-naphthoic acid. The latter compounds are useful in the art of preparing azo pigments and water-insoluble azo-dyestuffs or of developing azo dyestuffs upon textile fiber. In either procedure arylides of 2,3-hydroxy-naphthoic acid are used as coupling components for combination with various aryl-diazo compounds.

The arylides of 2,3-hydroxy-naphthoic acid have heretofore been generally prepared by reacting 2,3-hydroxy-naphthoic acid with the corresponding desirable aryl-amine in an inert solvent, such as benzene, toluene, or xylene, in the presence of a dehydrating agent such as phosphorus trichloride, phosphorus oxychloride or thionyl chloride. This method, although fairly satisfactory for the aryl-amines of low molecular weight, such as aniline, gives highly unsatisfactory results when used with aryl-amines of higher molecular weight, such as $\alpha$- or $\beta$-naphthylamine, anisidine, or nitroaniline. As a rule, the product in the latter cases contains a considerable amount of impurities which dull the shade of the ultimate dyestuff. Moreover, the reaction is a very delicate one, and very special precautions must be selected for each individual case to obtain an intermediate of high purity and giving satisfactory brilliance of shade.

We have now made the surprising discovery that if instead of using the aryl-amine base in the above procedure, the same is replaced by a halide of the aryl-amine, for instance, the hydrochloride, the reaction proceeds with unusual smoothness and regularly produces, in high yield, a product of greater purity than obtained by previous methods. The dyestuffs ultimately prepared from the intermediates thus formed similarly exhibit greater brilliance, due to the purity of said intermediates. These improvements result, no matter what the aryl-amine is that is being used, whether of high or low molecular weight; whether unsubstituted by groups other than the amine, or substituted by various groups, such as alkoxy, halogen, nitro and the like. Moreover, the use of aryl-amine salts renders the entire reaction uniform for practically all aryl-amines. This is an advantage of great importance in practice since it enables the preparation of a number of various arylides of 2,3-hydroxy-naphthoic acid with but a single set of apparatus.

Other incidental advantages flow from the selection of an aryl-amine halide in lieu of aryl-amine base for the reaction. One of these is the fact that the hydrochloride of an aryl-amine is in many cases easier to prepare and isolate in pure form than the base. In fact, in the case of many aryl-amines, the hydrochloride is always prepared first, and the base is then prepared therefrom by treatment with aqueous alkali and separation from the resulting aqueous salt solution.

Another advantage is that it is easier to dehydrate the reaction mixture where a salt of the aryl-amine is employed. Since the entire reaction is one of splitting off water by means of phosphorus trichloride, or the like, it is obvious that the reactants must initially be as free from water as possible. Now where the aryl-amine is used in the form of a salt, it is relatively easy to get rid of the final traces of moisture by partially evaporating the reaction mixture prior to the introduction of phosphorus trichloride. In the case, however, where the free base is employed, this procedure is frequently not feasible, since the aryl-amine tends to evaporate together with the inert solvent. It therefore becomes necessary in such cases to resort to costly and laborious drying procedures.

Still another advantage of our novel procedure is that the reaction is less violent, and that all the phosphorus trichloride may be added at once at the beginning of the reaction.

In the old procedure such a course was frequently impossible, due to the violence of the reaction. The dehydrating agent, therefore, had to be fed in gradually and with extreme care. This not only would increase the cost of labor, but would spread poisonous fumes into the surrounding atmosphere.

It is accordingly an object of our invention to improve the process of preparing arylides of 2,3-hydroxy-naphthoic acid whereby to improve the purity of the final product, to make the reaction more smooth and controllable, to make the reaction applicable uniformly to a great many aryl-amines including amines of high molecular weight, and in general to endow the process with the many and various advantageous improvements above enumerated or indicated.

Without limiting our invention to any specific procedure, the following examples are given to illustrate our preferred mode of carrying out the same. Parts given are parts by weight.

*Example 1*

100 parts of $\alpha$-naphthylamine are dissolved in 1400 parts of a hydrocarbon mixture having a reflux temperature of 93–95° C., for instance, a mixture consisting of 650 parts of benzene and 750 parts of toluene. 8 parts of 20° Bé. hydrochloric acid are added and the mixture is partially distilled until it is anhydrous, fresh dry solvent being continually introduced to compensate for the solvent distilled off. The mixture is now cooled to 60° C., and 131 parts of 2,3-hydroxy-naphthoic acid are added. 37.8 parts of phosphorus trichloride are now introduced and the mass is gradually heated to reflux within a period of 6 to 7 hours and then further kept at reflux temperature for about 15 hours. During this procedure hydrochloric acid is evolved and may be recovered for reuse in a subsequent batch. The mass is now cooled to about 75° C., diluted with water and distilled until free of solvent. (The latter may be collected and reused directly for a subsequent batch, without any intermediate drying step.) The residual mass is filtered and washed with hot water until free of mineral acid. The filter cake contains the $\alpha$-naphthalide of 2,3-hydroxy-naphthoic acid in high yield.

*Example 2*

A wet filter cake containing 100 parts of p-anisidine-hydrochloride is suspended in 1400 parts of toluene or xylene, and the mixture is distilled until it is anhydrous, the hydrocarbon portions of the distillate being returned to the original mass. The mixture is now cooled to 60° C. 118 parts of 2,3-hydroxy-naphthoic acid and 33.5 parts of phosphorus trichloride are now added, and the procedure continued as in Example 1.

The final product contains the para-anisidide of 2,3-hydroxy-naphthoic acid in high yield.

In a similar manner many other arylides of 2,3-hydroxy-naphthoic acid may be prepared with great efficiency. Among the various aryl-amines actually tried by us for the above purpose, the folowing may be mentioned:

| | |
|---|---|
| aniline | 2,5-dimethoxy-aniline |
| o-toluidine | $\alpha$-naphthylamine |
| m-toluidine | $\beta$-naphthylamine |
| m-nitraniline | o-anisidine |
| p-nitraniline | p-anisidine |

It should be understood that our invention is not limited to the precise details above disclosed, but is susceptible to many variations and modifications as will be readily understood to those skilled in the art.

We claim:

1. In the process of preparing an arylide of 2,3-hydroxy-naphthoic acid by reacting 2,3-hydroxy-naphthoic acid with an aryl-amine, the step of employing the latter reactant in the form of a halogen acid salt thereof.

2. In the process of preparing an arylide of 2,3-hydroxy-naphthoic acid by reacting 2,3-hydroxy-naphthoic acid with an aryl-amine, the step of employing the latter reactant in the form of its hydrochloric acid salt.

3. The process of preparing an arylide of 2,3-hydroxy-naphthoic acid which comprises reacting 2,3-hydroxy-naphthoic acid with the halogen acid salt of an aryl-amine in an inert solvent and in the presence of a dehydrating agent.

4. The process of preparing an arylide of 2,3-hydroxy-naphthoic acid which comprises reacting 2,3-hydroxy-naphthoic acid with the hydrochloride of an aryl-amine in an inert solvent and in the presence of phosphorus trichloride.

5. The process of preparing an arylide of 2,3-hydroxy-naphthoic acid which comprises effecting a mixture of a halogen acid salt of an aryl-amine with an inert organic liquid, partially evaporating the mixture to remove traces of moisture, adding 2,3-hydroxy-naphthoic acid and a dehydrating agent, and heating the mass to reflux until reaction is complete.

6. The process of preparing an arylide of 2,3-hydroxy-naphthoic acid which comprises effecting a mixture of a hydrochloride of an aryl-amine with an inert organic liquid, partially evaporating the mixture to remove traces of moisture, adding 2,3-hydroxy-naphthoic acid and phosphorus trichloride and heating the mass to reflux until reaction is complete.

In testimony whereof we affix our signatures.

JOHN M. TINKER.
LOUIS SPIEGLER.